United States Patent
Ouchi et al.

(10) Patent No.: US 6,420,068 B1
(45) Date of Patent: Jul. 16, 2002

(54) HYDROGEN STORAGE ALLOY ELECTRODE AND METHOD FOR MANUFACTURE THEREOF

(75) Inventors: Masutaka Ouchi, Tokushima; Yoshihiro Masuda, Naruto; Teruhiko Imoto, Tokushima; Kikuko Kato, Katano; Nobuyuki Higashiyama, Ikeda; Mamoru Kimoto, Hirakata; Yasuhiko Itoh, Yawata, all of (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 85 days.

(21) Appl. No.: 09/643,264

(22) Filed: Aug. 22, 2000

(30) Foreign Application Priority Data

Aug. 24, 1999 (JP) .............................. 11-236770

(51) Int. Cl.[7] .............................. H01M 4/58; C01B 6/24
(52) U.S. Cl. ................ 429/218.2; 429/223; 429/218.1; 429/220; 429/224; 420/900; 29/623.1
(58) Field of Search .............................. 429/218.2, 220, 429/223, 224, 218.1; 420/900; 29/623.1

(56) References Cited

U.S. PATENT DOCUMENTS 5,695,530 A * 12/1997 Hong et al. ................. 29/623.1
6,284,409 B1 * 9/2001 Higashiyama et al. ... 429/218.2

FOREIGN PATENT DOCUMENTS

| JP | 5-225975 | 9/1993 |
| JP | 10-106550 | 4/1998 |

* cited by examiner

*Primary Examiner*—Gabrielle Brouillette
*Assistant Examiner*—Angela J. Martin
(74) *Attorney, Agent, or Firm*—W. F. Fasse; W. G. Fasse

(57) ABSTRACT

A hydrogen storage alloy electrode containing, as a principal active material, a powder of hydrogen storage alloy having a $CaCu_5$ crystal structure and represented by the formula $MmNi_xCo_yMn_zM_w$, where M is at least one element selected from aluminum (Al) and copper (Cu), x is between 3.0 and 5.2, y is between 0 and 1.2, z is between 0.1 and 0.9, w is between 0.1 and 0.9, and the sum of x, y, z and w is between 4.4 and 5.4. The hydrogen storage alloy powder particles have a surface region and a bulk region enclosed within the surface region and have a higher nickel content in the surface region than in the bulk region. The hydrogen storage alloy electrode further contains an oxide and/or hydroxide of at least one rare-earth element selected from ytterbium (Yb), samarium (Sm), erbium (Er) and gadolinium (Gd).

7 Claims, 2 Drawing Sheets

HYDROGEN STORAGE ALLOY ELECTRODE AND METHOD FOR MANUFACTURE THEREOF

BACKGROUND OF THE INVENTION

1. Field of the Invention

The present invention relates to a hydrogen storage alloy electrode which can be used as a negative electrode for alkaline storage batteries and also to a method for manufacture of the hydrogen storage alloy electrode.

2. Description of Related Art

With the recent rapid expansion of the nickel-hydrogen storage battery market, there is an increasing demand to extend the lives of nickel-hydrogen storage batteries.

One of the factors that influence the lives of nickel-hydrogen storage batteries is the corrosion of hydrogen storage alloy particles for use as negative active material. Therefore, the improvement in corrosion resistance of hydrogen storage alloy electrodes appears to be a key solution to extending the lives of nickel-hydrogen storage batteries.

Japanese Patent Laying-Open No. Hei 10-106550 (1998) proposes a method of improving corrosion resistance of a hydrogen storage electrode by dispersing yttrium oxide or hydroxide therein to thereby suppress corrosion of hydrogen storage alloy particles in alkaline electrolytes.

However, the inventors of the present application have found from their investigations that the method described in the above-identified reference results not only in failure to provide an appreciable improving effect, but also in the reduction in hydrogen storing capacity of a hydrogen storage alloy electrode leading to build-up of a battery's internal pressure during charge.

SUMMARY OF THE INVENTION

It is an object of this invention to provide a hydrogen storage alloy electrode having improved corrosion resistance which, when incorporated in a storage battery, can improve its charge-discharge cycle performance and suppress build-up of its internal pressure during charge. It is a further object of this invention to provide a method for manufacture of such a hydrogen storage alloy electrode.

A hydrogen storage alloy electrode of this invention contains, as its principal active material, a powder of hydrogen storage alloy having a CaCu$_5$ crystal structure and represented by the formula MmNi$_x$Co$_y$Mn$_z$M$_w$, where M is at least one element selected from aluminum (Al) and copper (Cu), x is between 3.0 and 5.2 (3.0$\leq$x$\leq$5.2), y is between 0 and 1.2 (0$\leq$y$\leq$1.2), z is between 0.1 and 0.9 (0.1$\leq$z$\leq$0.9), w is between 0.1 and 0.9 (0.1$\leq$w$\leq$0.9), and the sum of x, y, z and w is between 4.4 and 5.4 (4.4$\leq$x+y+z+w$\leq$5.4). The hydrogen storage alloy powder consists of particles each having a surface region and a bulk region enclosed within the surface region. The powder particle has a higher nickel content in the surface region than in the bulk region. The electrode further contains an oxide and/or hydroxide of at least one rare-earth element selected from ytterbium (Yb), samarium (Sm), erbium (Er) and gadolinium (Gd).

As stated above, the hydrogen storage alloy powder particles have a surface region and a bulk region enclosed within the surface region. The surface and bulk regions of the hydrogen storage alloy powder particle can be defined in terms of nickel contents. That is, when a nickel content of the powder particle is measured along a line extending from a surface toward a center, its values become substantially constant at any location of measurement beyond a certain point. A series of such points makes a boundary. A region that extends from the boundary toward the surface can be defined as the surface region. A region inside the boundary can be defined as the bulk region where the powder particle has a substantially constant nickel content.

Specifically, the numbers of all constituent element atoms and oxygen atoms in the powder particle are measured at locations spaced at intervals of several nanometers from its surface toward its center by utilizing a scanning transmission electron microscope and an energy dispersive X-ray spectroscope. Then, a nickel content (atomic percent) can be calculated from a proportion in number of nickel atoms to all constituent element atoms and oxygen atoms.

The boundary at which a nickel content converges to a constant value can be determined from results obtained via the above-described procedure. Once it is determined, the surface region and the bulk region can be defined in the manner as described above.

In the present invention, the powder particle has a higher nickel content in the surface region than in the bulk region. As stated above, the nickel content of the powder particle is substantially constant in the bulk region and is varied in the surface region. In this specification, the "nickel content in the surface region" means the nickel content at an intermediate depth of the surface region, i.e., the nickel content measured at a location intermediate between the outermost surface and the boundary. Preferably, the nickel content is at least 1.1 times as high in the surface region as in the bulk region.

Characteristically, a hydrogen storage alloy electrode of this invention contains the aforementioned hydrogen storage alloy powder, as its primary active material, and an oxide and/or hydroxide of at least one of the above-listed rare-earth elements. Inclusion of such an oxide and/or hydroxide of rare-earth element increases the corrosion resistance of the hydrogen storage alloy electrode to alkaline electrolytes, resulting in the improved charge-discharge cycle performance. Since the increased corrosion resistance makes it difficult for the hydrogen storage alloy electrode to undergo electro-chemical property reduction in the alkaline electrolyte, the build-up of a battery's internal pressure during charge can be suppressed. As used herein, "oxide and hydroxide of a rare-earth element" refer to those containing the rare-earth element in the cation form.

Preferably, the aforementioned oxide and/or hydroxide of a rare-earth element are contained in the electrode in the amount of 0.1–5.0 parts by weight, based on 100 parts by weight of the hydrogen storage alloy powder. Inclusion thereof within the above-specified range further improves a battery's charge-discharge cycle performance and suppresses the build-up of a battery's internal pressure during charge more effectively.

Details are not clear as to how the hydrogen storage alloy electrode of this invention exhibits the increased corrosion resistance to alkaline electrolytes. It is believed, however, that the intrinsic alkaline electrolyte corrosion resistance of the hydrogen storage alloy powder particle in its surface region is markedly enhanced by deposition thereon of the oxide and/or hydroxide of a rare-earth element.

DESCRIPTION OF THE PREFERRED EXAMPLES

Figure 1:
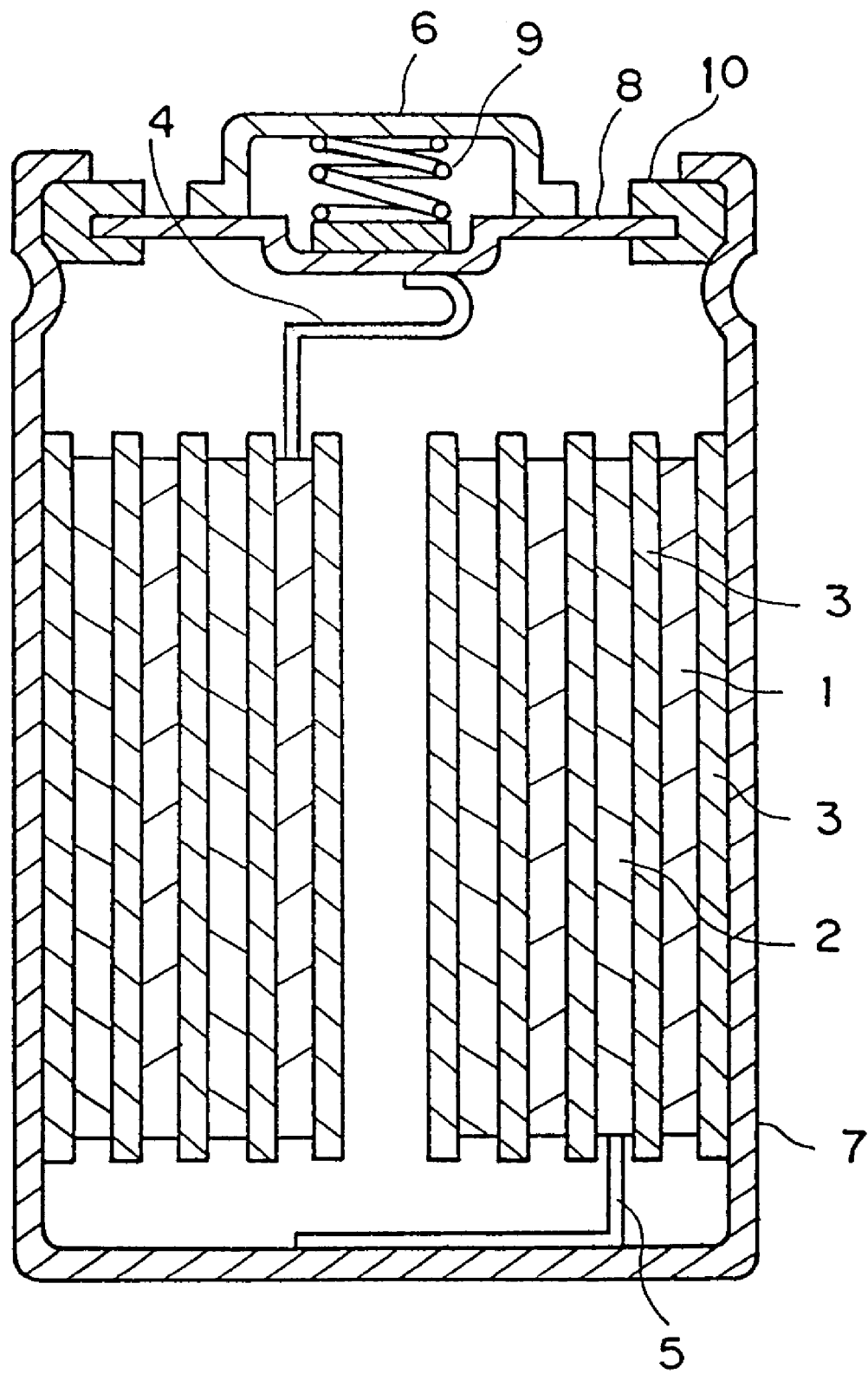
FIG. 1 is a sectional view illustrating a nickel-hydrogen storage battery in accordance with an embodiment of the present invention.

The present invention is below described in more detail with reference to preferred examples. It will be recognized that the following examples merely illustrate the practice of the present invention but are not intended to be limiting thereof. Suitable changes and modifications can be effected without departing from the scope of the present invention.

Experiment 1

In this Experiment 1, the effect of increasing a nickel content of the hydrogen storage alloy powder particle in the surface region in comparison to the bulk region, as well as the effect of incorporating an oxide and/or hydroxide of a rare-earth element, were observed.

Preparation of Hydrogen Storage Alloy Powder

Mm (misch metal), Ni, Co, Al and Mn were mixed in a molar ratio of 1.0:3.1:0.8:0.4:0.7 to provide a mixture, where Mm was an alloy consisting of 25 atomic % of La, 50 atomic % of Ce, 6 atomic % of Pr and 19 atomic % of Nd, and Ni, Co, Al and Mn were 99.9% pure metals, respectively. The mixture was caused to melt under argon atmosphere in an electric arc melting furnace and then left to cool down naturally to produce a hydrogen storage alloy represented by the formula $MmNi_{3.1}Co_{0.8}Al_{0.4}Mn_{0.7}$ and having a $CaCu_5$ crystal structure. The resulting ingot of hydrogen storage alloy was mechanically pulverized in the air to provide an alloy powder (A) having an average particle size of 30 $\mu$m.

The alloy powder (A) was immersed in aqueous solution of hydrochloric acid (pH=1.0) maintained at 25° C. and stirred for 15 minutes, washed with water and then dried to obtain an alloy powder (B).

Also, the alloy powder (A) was immersed in aqueous solution of potassium hydroxide (specific gravity of 1.3) maintained at 70° C. for one hour, washed with water and then dried to obtain an alloy powder (C).

The treating conditions used to obtain alloy powders (A), (B) and (C) are listed in Table 1.

TABLE 1

| | Condition |
|---|---|
| Alloy Powder A | Not Treated with Aq. HCl Soln. |
| Alloy Powder B | Treated with Aq. HCl Soln. |
| Alloy Powder C | Treated with Alkaline Soln. |

Examples 1–10

100 parts by weight of the alloy powder (B), 0.2 parts by weight of the rare-earth metal oxide or hydroxide listed in Table 2 and 20 parts by weight of 5 wt. % aqueous solution of PEO (polyethylene oxide) were mixed to provide a paste. In Examples 5 and 10 where two types of rare-earth metal oxides or hydroxides were used in combination, each rare-earth metal oxide or hydroxide was used in the amount of 0.1 parts by weight.

Each paste was coated on opposite sides of a conductive substrate constructed from nickel-plated punching metal, dried at room temperature and cut to a predetermined length, so that a hydrogen storage alloy electrode was fabricated.

TABLE 2

| | Rare-Earth Metal Oxide or Hydroxide |
|---|---|
| Ex. 1 | $Yb_2O_3$ |
| Ex. 2 | $Gd_2O_3$ |
| Ex. 3 | $Er_2O_3$ |
| Ex. 4 | $Sm_2O_3$ |
| Ex. 5 | $Yb_2O_3, Gd_2O_3$ |
| Ex. 6 | $Yb(OH)_3$ |
| Ex. 7 | $Gd(OH)_3$ |
| Ex. 8 | $Er(OH)_3$ |
| Ex. 9 | $Sm(OH)_3$ |
| Ex. 10 | $Yb(OH)_3, Gd(OH)_3$ |

An AA-size positive-limited nickel-hydrogen storage battery (nominal capacity of 1,000 mAh) was assembled by utilizing each of the above-obtained hydrogen storage alloy electrodes as a negative electrode. A conventionally known sintered nickel plate was used for a positive electrode, an anti-alkaline non-woven fabric for a separator and 30 wt. % aqueous solution of potassium hydroxide for an electrolyte solution.

FIG. 1 is a schematic sectional view of the nickel-hydrogen storage battery assembled. The nickel-hydrogen storage battery includes a positive electrode 1, a negative electrode 2, a separator 3, a positive lead 4, a negative lead 5, a positive external terminal 6, a negative casing 7 and a top closure 8. The positive electrode 1, the negative electrode 2 and the separator 3 between them are rolled up in a spirally wound configuration and accommodated within the negative casing 7. The positive lead 4 and negative lead 5 provide electrical connections between the positive electrode 1 and top closure 8 and between the negative electrode 2 and negative casing 7, respectively. The battery is sealed by an insulating gasket 10 placed between the negative casing 7 and the top closure 8. Provided between the positive external terminal 6 and the top closure 8 is a coil spring 9. In case of abnormal build-up of a battery's internal pressure, the coil spring is compressed to allow gases within the battery to escape therefrom to the surrounding air.

The above procedures resulted in the assembly of nickel-hydrogen storage batteries of Examples 1–10.

Comparative Example 1

A hydrogen storage alloy electrode was fabricated which precluded rare-earth metal oxide and hydroxide. By using it as a negative electrode, a nickel-hydrogen storage battery was assembled to investigate how the inclusion of rare-earth metal oxide or hydroxide affected battery performances.

Specifically, 20 parts by weight of 5 wt. % aqueous solution of PEO (polyethylene oxide) was solely added to 100 parts by weight of the alloy powder (B) to provide a paste free of rare-earth metal oxide and hydroxide. By utilizing this paste, a nickel-hydrogen storage battery of Comparative Example 1 was assembled in the same manner as in Examples 1–10.

Comparative Example 2

A hydrogen storage alloy electrode was fabricated using the alloy powder (A). By using it as a negative electrode, a nickel-hydrogen storage battery was assembled to observe how the higher nickel concentration of the hydrogen storage alloy powder in the surface region than in the bulk region affected battery performances.

Specifically, 100 parts by weight of the alloy powder (A), 0.2 parts by weight of ytterbium oxide ($Yb_2O_3$) and 20 parts by weight of 5 wt. % aqueous PEO (polyethylene oxide) were mixed to prepare a paste. By utilizing this paste, a nickel-hydrogen storage battery of Comparative Example 2 was assembled in the same manner as in Examples 1–10.

Comparative Example 3

For the purpose of comparing to the hydrogen storage alloy electrode disclosed in Japanese Patent Laying-Open No. Hei 10-106550 (1998), a hydrogen storage alloy electrode was fabricated using the alkali-treated alloy powder (C) and yttrium oxide ($Y_2O_3$). By using this as a negative electrode, a nickel-hydrogen storage battery was assembled.

Specifically, 100 parts by weight of the alloy powder (C), 0.2 parts by weight of yttrium oxide and 20 parts by weight of 5 wt. % aqueous PEO (polyethylene oxide) were mixed to prepare a paste. By utilizing this paste, a nickel-hydrogen storage battery of Comparative Example 3 was assembled in the same manner as in Examples 1–10.

Comparative Example 4

100 parts by weight of the alloy powder (C), 0.2 parts by weight of ytterbium oxide and 20 parts by weight of 5 wt. % aqueous PEO (polyethylene oxide) were mixed to provide a paste. By utilizing this paste, a nickel-hydrogen storage battery of Comparative Example 4 was assembled in the same manner as in Examples 1–10.

The alloy powders used and the compounds incorporated in the hydrogen storage alloy electrodes of Examples 1–10 and Comparative Examples 1–4 are listed in Table 3.

TABLE 3

|  | Used Alloy Powder | Compounds incorporated in the electrodes |
| --- | --- | --- |
| Ex. 1 | Alloy Powder B | $Yb_2O_3$ |
| Ex. 2 | Alloy Powder B | $Gd_2O_3$ |
| Ex. 3 | Alloy Powder B | $Er_2O_3$ |
| Ex. 4 | Alloy Powder B | $Sm_2O_3$ |
| Ex. 5 | Alloy Powder B | $Yb_2O_3,Gd_2O_3$ |
| Ex. 6 | Alloy Powder B | $Yb(OH)_3$ |
| Ex. 7 | Alloy Powder B | $Gd(OH)_3$ |
| Ex. 8 | Alloy Powder B | $Er(OH)_3$ |
| Ex. 9 | Alloy Powder B | $Sm(OH)_3$ |
| Ex. 10 | Alloy Powder B | $Yb(OH)_3,Gd(OH)_3$ |
| Comp. Ex. 1 | Alloy Powder B | None |
| Comp. Ex. 2 | Alloy Powder A | $Yb_2O_3$ |
| Comp. Ex. 3 | Alloy Powder C | $Y_2O_3$ |
| Comp. Ex. 4 | Alloy Powder C | $Yb_2O_3$ |

Evaluation Method of a Battery's Internal Pressure

Each battery was charged at the 0.2 C rate at 25° C. for 6 hours and then discharged at the 0.2 C rate to 1.0 V. This unit cycle was repeated three times to perform a three-cycle charge-discharge test. Subsequently, the battery was charged at the 1.0 C rate under measurement of its internal pressure. When the internal pressure reached 10 $kgf \cdot cm^{-2}$, a charge time was recorded.

Evaluation Method of Charge-Discharge Cycle Performance

Each battery was charged at the 0.2 C rate at 25° C. for 6 hours and then discharged at the 0.2 C rate to 1.0 V. This unit cycle was repeated until its discharge capacity was reduced to 90 or lower % of the initial capacity and the number of cycles was recorded. The "initial capacity" means a first-cycle discharge capacity.

The measurement results, indicative of the internal pressure behavior and charge-discharge cycle performance of each battery, are given in Table 4.

TABLE 4

|  | Internal Pressure (Min.) | Cycle Performance (Cycles) |
| --- | --- | --- |
| Ex. 1 | 135 | 650 |
| Ex. 2 | 120 | 585 |
| Ex. 3 | 110 | 540 |
| Ex. 4 | 115 | 530 |
| Ex. 5 | 125 | 630 |
| Ex. 6 | 125 | 630 |
| Ex. 7 | 115 | 575 |
| Ex. 8 | 110 | 530 |
| Ex. 9 | 110 | 515 |
| Ex. 10 | 120 | 615 |
| Comp. Ex. 1 | 75 | 300 |
| Comp. Ex. 2 | 80 | 310 |
| Comp. Ex. 3 | 70 | 260 |
| Comp. Ex. 4 | 70 | 290 |

As apparent from the results shown in Table 4, the nickel-hydrogen storage batteries assembled in Examples 1–10 exhibit the prolonged charge time before the internal pressure reached 10 $kgf \cdot cm^{-2}$ and the increased cycle numbers compared to those assembled in Comparative Examples 1–4. This demonstrates that the hydrogen storage alloy electrode according to the present invention, when incorporated in nickel-hydrogen storage batteries, prevents the build-up of internal pressure during charge thereof and improves their charge-discharge cycle performances.

Observation of Near-Surface Sections of Hydrogen Storage Alloy Powder Particles (A), (B) and (C)

For the alloy powder particles (A), (B) and (C), each sample was observed for its section from a surface toward a center at intervals of several nanometers to a depth of 200 nm, using a scanning transmission electron microscope and an energy dispersive X-ray spectroscope. All constituent element atoms of the sample particle, i.e., La, Ce, Pr, Nd, Ni, Co, Mn and Al, and oxygen atoms were measured at each location for their numbers. Then, the nickel content (atomic percent) was calculated from a proportion in number of nickel atoms to all the aforementioned atoms.

Figure 2:
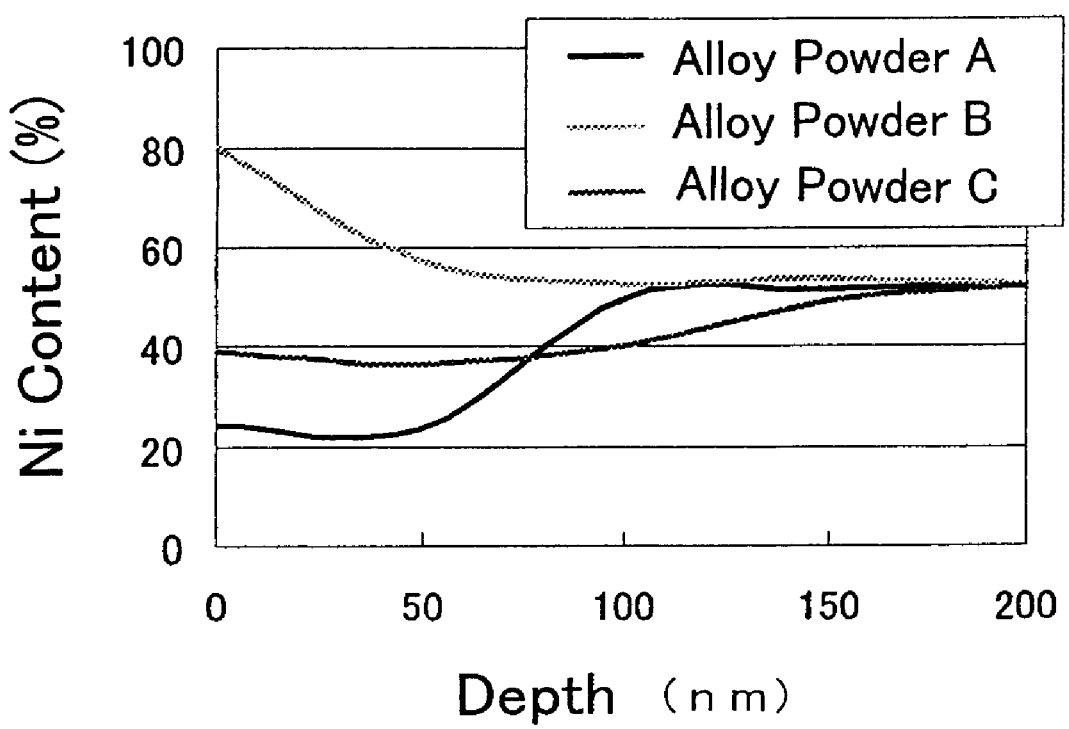
FIG. 2 is a graph showing the distribution of nickel atoms within the hydrogen storage alloy powder particles in accordance with an embodiment of the present invention.

FIG. 2 is a graph showing the variation of a nickel content of a sample powder particle with the depth (up to about 200 nm) from its surface, for the alloy powders (A), (B) and (C). As can be clearly seen from FIG. 2, the alloy powder particles (A), (B) and (C) each shows the convergence of its nickel content to a specific level at a particular depth. A region where the nickel content is maintained at this specific level is defined as the bulk region. The nickel content in the bulk region is within the approximate range of 50–54 atomic %. A region extending from the bulk region toward the surface is defined as the surface region.

As illustrated in FIG. 2, the alloy powder particles (B) were found to have a higher nickel content in the surface region than in the bulk region. This is probably because when they are immersed and stirred in an aqueous solution of hydrochloric acid, less reactive elements and oxygen in oxides are removed from the surface regions to result in increasing a relative amount of nickel atoms present in the surface region.

On the other hand, the alloy powder particles (A) were found to have a lower nickel content in the surface region than in the bulk region. This is believed to be due to production of oxides in the surface region.

Like the alloy powder (A), the alloy powder particles (C) were found to have a lower nickel content in the surface region than in the bulk region. However, the alloy powder (C) shows a gentler concentration gradient of nickel in the particle surface region compared to the alloy powder (A).

For the alloy powders (A), (B) and (C), the depth and nickel content of the surface region, as well as the ratio in nickel content of the surface to bulk region, are shown in Table 5. The nickel content of the surface region, as given in Table 5, is a representative value measured at an intermediate depth of the surface region.

TABLE 5

| Surface Region | Alloy Powder A | Alloy Powder B | Alloy Powder C |
|---|---|---|---|
| Depth (nm) | 110 | 80 | 180 |
| Ni Content | 28 | 60 | 38 |
| S/B Ratio* | 0.54 | 1.16 | 0.74 |

*A Ratio in Ni Content of the Surface to Bulk Region

As can be appreciated from the above, the alloy powder (B), as prepared by treating the alloy powder (A) with an acid solution, exhibits a higher nickel content in the surface region than in the bulk region.

Experiment 2

In this Experiment 2, the amount of rare-earth metal oxide incorporated in the hydrogen storage alloy electrode was varied to investigate its suitable range.

Examples 11–16

Example 1 of Experiment 1 was followed, except that the amount by weight of ytterbium oxide was varied within the range indicated in Table 6, to assemble nickel-hydrogen storage batteries of Examples 11–16. The battery of Example 13 is identical to the battery obtained in Example 1 of Experiment 1.

TABLE 6

| | Amount of Yb₂O₃ (Parts by Weight) |
|---|---|
| Ex. 11 | 0.05 |
| Ex. 12 | 0.1 |
| Ex. 13 (Ex. 1) | 0.2 |
| Ex. 14 | 1.0 |
| Ex. 15 | 5.0 |
| Ex. 16 | 10 |

The batteries of Examples 11–16 were tested for internal pressure behavior and charge-discharge cycle performance according to the same procedures used in the above Experiment 1. The results are given in Table 7.

TABLE 7

| | Internal Pressure (Min.) | Cycle Performance (Cycles) |
|---|---|---|
| Ex. 11 | 110 | 560 |
| Ex. 12 | 130 | 630 |
| Ex. 13 (Ex. 1) | 135 | 650 |

TABLE 7-continued

| | Internal Pressure (Min.) | Cycle Performance (Cycles) |
|---|---|---|
| Ex. 14 | 135 | 640 |
| Ex. 15 | 130 | 620 |
| Ex. 16 | 105 | 550 |

As can be clearly seen from Table 7, the batteries of Examples 12–15 exhibit the extended charge time before the internal pressure reached 10 kgf·cm$^{-2}$ and the suppressed build-up of internal pressure, compared to the batteries of Examples 11 and 16. Also, the declining of discharge capacity with charge-discharge cycles has been found to be gentler.

As can be appreciated from the above results, it is particularly preferred that the rare-earth metal oxide is incorporated in the hydrogen storage alloy electrode in the amount of 0.1–5.0 parts by weight, based on 100 parts by weight of the hydrogen storage alloy powder used.

Experiment 3

In this Experiment 3, a pH value of the acid solution used to treat the hydrogen storage alloy powder was varied to observe its effect.

Examples 17–21

The pH of hydrochloric acid was adjusted to the values indicated in Table 8 to prepare treating solutions. Example 1 of Experiment 1 was followed, except that the above-prepared treating solutions were used, to assemble nickel-hydrogen storage batteries of Examples 17–21. The battery of Example 19 is identical to the battery obtained in Example 1 of Experiment 1.

TABLE 8

| | pH |
|---|---|
| Ex. 17 | 0.5 |
| Ex. 18 | 0.7 |
| Ex. 19 (Ex. 1) | 1.0 |
| Ex. 20 | 2.0 |
| Ex. 21 | 3.0 |

The batteries of Examples 17–21 were tested for internal pressure behavior and charge-discharge cycle performance according to the same procedures used in the above Experiment 1. The results are given in Table 9.

TABLE 9

| | Internal Pressure (min.) | Cycle Performance (Cycles) |
|---|---|---|
| Ex. 17 | 105 | 585 |
| Ex. 18 | 125 | 630 |
| Ex. 19 (Ex. 1) | 135 | 650 |
| Ex. 20 | 130 | 620 |
| Ex. 21 | 105 | 590 |

As can be clearly seen from Table 9, the batteries of Examples 18–20 exhibit the extended charge time before the internal pressure reached 10 kgf·cm$^{-2}$ and the suppressed build-up of internal pressure, compared to the batteries of Examples 17 and 21. They also exhibit superior charge-discharge cycle performances.

As apparent from the above results, it is particularly preferred that the pH of the acid solution used to treat the hydrogen storage alloy powder is maintained within the range of 0.7–2.0.

The hydrogen storage alloy powders used in Experiments 1–3 are those formed from the hydrogen storage alloys manufactured under argon atmosphere in an electric arc furnace. It has been found that similar results can be obtained with the use of hydrogen storage alloy powders manufactured by a gas atomizing method.

In Experiments 1–3, aqueous hydrochloric acid was used for the acid solution. It has also been confirmed that similar results are obtained where an aqueous solution of nitric acid, phosphoric acid or acetic acid, or a mixture thereof is used.

In accordance with the present invention, a hydrogen storage alloy electrode is provided which has an improved resistance to corrosion by alkaline electrolytes and, when incorporated in a battery, improves charge-discharge cycle performance characteristics of the battery and prevents the excessive build-up of pressure within the battery.

What is claimed is:

1. A hydrogen storage alloy electrode containing, as a principal active material, a powder of hydrogen storage alloy having a $CaCu_5$ crystal structure and represented by the formula $MmNi_xCo_yMn_zM_w$, where M is at least one element selected from aluminum (Al) and copper (Cu), x is between 3.0 and 5.2, y is between 0 and 1.2, z is between 0.1 and 0.9, w is between 0.1 and 0.9, and the sum of x, y, z and w is between 4.4 and 5.4;

said hydrogen storage alloy powder comprising powder particles having a surface region and a bulk region enclosed within the surface region and having a higher nickel content in the surface region than in the bulk region; and said electrode further containing an oxide and/or hydroxide of at least one rare-earth element selected from ytterbium (Yb), samarium (Sm), erbium (Er) and gadolinium (Gd).

2. The hydrogen storage alloy electrode of claim 1 wherein said oxide and/or hydroxide of rare-earth element are contained in the amount of 0.1–5.0 parts by weight, based on 100 parts by weight of the hydrogen storage alloy powder.

3. A method for manufacture of a hydrogen storage alloy electrode comprising the steps of:

(1) preparing a powder of hydrogen storage alloy having a $CaCu_5$ crystal structure and represented by the formula $MmNi_xCo_yMn_zM_w$ wherein M is at least one element selected from aluminum (Al) and copper (Cu), x is between 3.0 and 5.2, y is between 0 and 1.2, z is between 0.1 and 0.9, w is between 0.1 and 0.9, and the sum of x, y, z and w is between 4.4 and 5.4;

(2) treating said hydrogen storage alloy powder with an acid solution;

(3) mixing the hydrogen storage alloy powder treated in the step (2) with an oxide and/or hydroxide of at least one rare-earth element selected from ytterbium (Yb), samarium (Sm), erbium (Er) and gadolinium (Gd) to form a paste; and (4) applying the paste to an electrically conductive substrate.

4. The method of claim 3 wherein said acid solution used in step (2) has a pH within the range of 0.7–2.0.

5. The method of claim 3 wherein, in step (1), said hydrogen storage alloy powder is manufactured by a gas atomizing method.

6. A nickel-hydrogen storage battery incorporating the hydrogen storage alloy electrode of claim 1 as a negative electrode.

7. A nickel-hydrogen storage battery incorporating the hydrogen storage alloy electrode manufactured according to the method of claim 3 as a negative electrode.

* * * * *